(12) United States Patent
Houdusse et al.

(10) Patent No.: US 7,402,205 B2
(45) Date of Patent: Jul. 22, 2008

(54) COMPOSITION COMPRISING WATER- AND AIR-HARDENABLE BINDERS AND ITS USE NOTABLY TO THE PREPARATION OF A PRODUCT HAVING THE ASPECT OF A NATURAL STONE

(75) Inventors: Olivier Houdusse, Arles (FR); Ahmed Zoubir, Arles (FR)

(73) Assignee: Laboratoire d'Etudes et de Recherches sur les Materiaux, L.E.R.M., Arles (FR)

( * ) Notice: Subject to any disclaimer, the term of this patent is extended or adjusted under 35 U.S.C. 154(b) by 617 days.

(21) Appl. No.: 10/962,547

(22) Filed: Oct. 13, 2004

(65) Prior Publication Data
US 2005/0081757 A1 Apr. 21, 2005

(30) Foreign Application Priority Data
Oct. 13, 2003 (FR) .................................. 03 12011

(51) Int. Cl.
*C04B 11/00* (2006.01)
(52) U.S. Cl. .................. 106/772; 106/778; 106/792
(58) Field of Classification Search ................. 106/713, 106/790, 772, 778, 792
See application file for complete search history.

(56) References Cited

U.S. PATENT DOCUMENTS

| 138,956 | A | * | 5/1873 | Tartiere | |
|---|---|---|---|---|---|
| 196,300 | A | * | 5/1877 | Knight et al. | |
| 3,912,838 | A | * | 10/1975 | Kraus et al. | |
| 6,346,190 | B1 | * | 2/2002 | Khare et al. | 208/244 |
| 6,544,410 | B1 | * | 4/2003 | Gislason et al. | 208/247 |
| 6,635,795 | B2 | * | 10/2003 | Gislason et al. | 585/820 |
| 6,649,555 | B2 | * | 11/2003 | Dodwell et al. | 502/53 |
| 6,930,074 | B2 | * | 8/2005 | Khare et al. | 502/342 |

FOREIGN PATENT DOCUMENTS

| BE | 891.555 | 4/1982 |
|---|---|---|
| CN | 1 378 989 | 11/2002 |
| DE | 24 37 544 | 2/1976 |
| EP | 0 611 735 | 8/1994 |
| EP | 0 774 445 | 5/1997 |
| FR | 2 201 387 | 4/1974 |
| GB | 1077665 | 8/1967 |
| JP | 59 069462 | 4/1984 |
| JP | 02 048905 | 2/1990 |
| RU | 1 781 264 | 12/1992 |
| WO | WO 2006/134080 A1 * | 12/2006 |

OTHER PUBLICATIONS

Derwent Abstract 1980-34730C☐☐☐☐DD 140245 (Herr et al.) Feb. 20, 1980, abstract only for this "east" german patent.*
Answer 15 of 36 of Chemical Abstracts on STN☐☐☐☐"Gypsum0floor plaster-lime binders", Pietron, Cement-Wapno-Gips (1978), 32(3), 73-80. Polish. (english abstract only).*
Chemical Abstracts + Indexes, American Chemical Society, Columbus, Ohio, US, Feb. 24, 1992, XP000375377 ISSN: 0009-2258 (abstract).

* cited by examiner

*Primary Examiner*—Paul Marcantoni
(74) *Attorney, Agent, or Firm*—Young & Thompson

(57) ABSTRACT

Composition comprising water- and air-hardenable binders and its use notably to the preparation of a product having the aspect and the properties of a natural stone.

Composition comprising water- and air-hardenable binders, exhibiting after hardening properties comparable at least to those of a natural stone or of a concrete, characterised in that it includes, as binders:
  natural and air-borne hydraulic lime, and
  moulding plaster.

18 Claims, No Drawings

COMPOSITION COMPRISING WATER- AND AIR-HARDENABLE BINDERS AND ITS USE NOTABLY TO THE PREPARATION OF A PRODUCT HAVING THE ASPECT OF A NATURAL STONE

BACKGROUND OF THE INVENTION

1. Field of the Invention

The present invention relates to a composition comprising water- and air-hardenable binders, exhibiting after hardening properties comparable at least to those of a natural stone or of a concrete.

The invention also concerns the use of the composition according to the invention to the realisation of moulded objects having the aspect and the properties of the stone, in particular of structures and of statutes, of slabs, paving blocks, city or interior furniture, chimneys and analogous objects.

The invention also concerns the application of the composition according to the invention to the realisation of a finish-polishing mortar or finishing and decoration coats.

2. Description of the Related Art

Among the hydraulic binders known, lime, plaster and cement can be mentioned, notably.

Lime, which has been known for a very long time, has been used in the past notably in the building trade, for example for sealing stones.

Lime has been far less used since the discovery of cement which enables to realise mortars, concretes and moulded objects having mechanical properties vastly greater than those which may be obtained with lime.

The objects and coats realised on the basis of cement have the major shortcoming of requiring long hardening times which slow down considerably the production rates.

On the other hand, the mortars and concretes obtained with cement are subject to retraction when hardening which promotes the formation of microcracks, thereby making moulded objects brittle.

Besides, when mortar or concrete is cast into a mould, the cast matter is generally not self-placing, so that it is necessary to use tools for kneading, vibrating or flattening the surface of the matter.

Plaster is used currently for moulding diverse objects.

However, plaster does not resist to the contact of water, so that the moulded objects made of plaster may not be used outdoors.

Moreover, the mechanical properties of plaster are vastly lower than those of concrete.

BRIEF SUMMARY OF THE INVENTION

The purpose of the present invention is to remedy the shortcomings above while offering a water- and air-hardenable composition exhibiting after hardening properties comparable at least to those of a natural stone or of a concrete without exhibiting the shortcomings of the former.

According to the invention, said composition is characterised in that it includes, as binders:

natural and air-borne hydraulic lime, and
moulding plaster.

DETAILED DESCRIPTION OF THE PREFERRED EMBODIMENTS

By hydraulic lime is meant a mixture including $Ca(OH)_2$ essentially and low calcium silicate content. The air-borne lime is $Ca(OH)_2$. These definitions exclude quick lime and dead lime.

It has been noticed surprisingly that the mixture of two binders (plaster and hydraulic lime) a priori incompatible, known and used separately for a very long time, enables to realise products having unexpected properties as regards those known for each of these binders.

The innovating advantages and aspects of the composition according to the invention are detailed below:

the first advantage of that composition lies in that it enables to obtain a mineral material having the (internal and external) aspect of a copying stone, the second corresponds to the fact that the physical characteristics of the material created are very close to the material to be imitated: hardness, absorption, density, porosity, resistance, etc . . . , the third corresponds to the use of a mixture of two binders: sulphatic binders (plaster) and lime (air-borne and natural hydraulic lime), the fourth point, of technical order, enables to mould difficult and complex parts with very satisfying superficial aspect and to obtain high short-term resistances (resistance equivalent to that of a calcareous stone after 15 minutes at 3 hours), the fifth point corresponds to the lack of retraction and therefore enables to minimise microcracking of the material relative to the desiccation thereof (a problem frequently encountered on the extent products).

Besides, another important aspect of the material obtained according to the invention lies in that it may be offered in different ranges of products enabling to obtain different features in fresh or hardened condition in relation to the material to be imitated or of the type of implementation (finish-polishing mortar, moulding material, self-placing material, absence of bubbling, aspect, veins . . . ), by simple modification of the different proportions of the different ingredients.

Preferably, the composition according to the invention includes moreover mineral loads, calcareous and/or siliceous loads, according to the desirable properties.

Preferably also the composition according to the invention includes additionally a fluidising and water-reducing adjuvant of the type used in current compositions in artificial materials (based on cement, plaster, etc . . . ).

For exemplification, this adjuvant may be the high water-reducing super-plasticizer CIMFLUID 2002 available from Axim (new generation adjuvant based on modified polycarboxylate): dosage of the order of 1 to 3% of the binder.

According to an advantageous version of the invention, the composition includes additionally at least one adjuvant selected among the group comprising a set retardant, an anti-bubbling agent, an air entrainer and the mixtures thereof.

In this view, both following adjuvants should be mentioned in particular:

Retardant (Retardant P from Lafarge Prestia): dosage to be suited relative to the external temperature and to the setting time desired (0% corresponds to approximately 10 to 15 min and 1% of the order of 1 hour setting delay), powder adjuvant, Cimparement (An anti-bubbling agent based on synthetic polymer and alcohol ether): dosage of the order of 0.1 to 0.5%, liquid adjuvant.

According to the result requested, the proportion in weight of lime and that of plaster may range between 25 and 75% of the total weight of both these binders.

Besides, the quantity of mineral loads may range between 0.5 and 6 times the weight of both these binders.

On the other hand, the proportion in weight of the adjuvants may range between 0 and 5% of the binders.

There are two examples of formulation of the composition according to the invention:

| Nature of the constituents | Material 1: Fontvieille stone type tender calcareous stone | Material 2: Marble type harder stone |
| --- | --- | --- |
| 1. Hydraulic lime NHL | 315 Kg/m$^3$ | 500 Kg/m$^3$ |
| 2. Moulding plaster | 315 Kg/m$^3$ | 500 Kg/m$^3$ |
| 3. Fine calcareous load (0/0.6 mm): mixture of crushed powder marble | 750 Kg/m$^3$ | 500 Kg/m$^3$ |
| 4. Siliceous load (0/0.6 mm) | 450 Kg/m$^3$ | — |
| 5. Siliceous fine | 80 Kg/m$^3$ | — |
| 6. New generation fluidiser adjuvant | 18 Kg/m$^3$ | 20 Kg/m$^3$ |
| 7. Other adjuvants: retardant, anti-bubbling agent, air entrainer, etc . . . | 1 to 5 Kg/m$^3$ | 1 to 5 Kg/m$^3$ |
| 8. Water | 300 Kg/m$^3$ | 350 Kg/m$^3$ |

One of the advantages of the composition according to the invention lies in that it may be implemented in a relatively simple way with different types of material. Tests have been carried out with laboratory crushers, industrial kneading machines, concrete mixers and an electric drill-carried stirring system. The impact of the use of these different types of materials is carried forward to the kneading time. Indeed, the kneading energy is a major factor and enables the adjuvants to play their part as fluidisers. Thus, the smaller the kneading energy, the longer the kneading time should be in order to obtain a placing material.

Thus, the easiest kneading solution consists in injecting all the dry elements (or a pre-formulated mixture), then in introducing water gradually with the adjuvants. The material goes from a dry ground condition, through a wet condition, to a self-placing condition, finally.

The kneading time ranges generally between 1 and 10 minutes according to the matter and to the materials used.

According to the type of application (moulding, slab paving, finish-polishing mortar, etc . . . ) the rheology of the fresh material will be different (self-placing materials for moulding and, unctuous and sticky for finish-polishing mortars).

The hardening of the material (and hence the drawing if necessary) takes place between 15 minutes and 3 hours after the beginning of the kneading. This parameter may nevertheless be easily suited to the constraints. This item is a major point of the innovation. Indeed, it enables to increase the drawing rate in the field of prefabrication of concrete objects or parts, currently realised with cement.

No cure is necessary, since the material does not exhibit any self-desiccating retraction and the increase in resistances takes place essentially in open air by lime carbonation.

In order to put in evidence the characteristics of the materials obtained according to the invention and of the cement-based materials, different tests have been realised on these materials. The comparison of the results obtained with those indicated on the sheets produced and supplied by the carriers, is presented in the table below:

|  | Provence stone (Estaillades) | Formulation according to the invention | Cement formulation |
| --- | --- | --- | --- |
| Apparent density (Kg/m$^3$) | 1850 to 1950 | 1850 | 2100 |
| Setting time | N/A | 1 h | 6 to 12 h |
| Porosity (%) | 27 to 31 | 25 | 19 |
| Capillarity coefficient $C_1$ (g/(m$^2 \cdot$ sec$^{0.5}$)) | 70 | 65 | 29 |
| Sound speed (m/s) | 2400 to 3200 | 2610 | 3500 |
| Compression mechanical strength (MPa) | 10 to 25 | 7 (after 2 hrs) 10 (after 3 days) 15 (after 28 days) 25 (after 90 days) 40 (long term) | 4 (after 12 hs) 25 (after 3 days) 40 (after 28 days) 40 (after 90 days) 40 (long term) |
| Flexion mechanical resistance (MPa) | 3 to 6 | 8 | 7 |
| Frost/defrost cycle resistance (number of cycles) | 40 | 40 | 35 |
| Surface hardness at 28 days (mm) | 0.7 | 0.6 | 0.3 |
| Retraction (μm/m) | N/A | 50 | −700 |
| Swelling (μm/m) | N/A | 200 | 200 |

The analysis of the results mentioned in the table below puts in evidence the main following indications:
- the density of the formulation according to the invention is approximately 15% smaller than that of the cement-based formulation and of the same order of magnitude as natural stone,
- the general characteristics of the material according to the invention, are very close to those of Provence Stone-type calcareous stones,
- the main advantages of the formulation according to the invention, comparatively to the cement formulation are: greater short-term resistance, the absence of retraction and smaller density. Besides, the long-term resistances and the hardness of both materials (formulation according to the invention and cement formulation) are of the same order of magnitude.

The tests have shown on the one hand that the formulation according to the invention might bring numerous advantages regarding the manufacturing process of materials having the aspect of calcareous stones (with respect to the cement-base formulations used currently). On the other hand, the cement-based formulation is naturally (binder type) difficult to optimise (see table thereafter). Indeed the characteristics of that formulation may not be improved without in-depth modification of the different components used.

| Characteristics | Cement-based formulation | Formulation according to the invention |
| --- | --- | --- |
| Hardening time before drawing | 6 to 12 h | 2 to 3 h (optimisation of the utilisation of the tooling and of the working teams) |
| Drawing resistance | 3 MPa | 7 MPa (enables less risky and easier drawing) |
| Long time resistance | 30 to 40 MPa | 25 to 30 MPa |
| Workability | Compulsory handover or vibration | Better workability, easier implementation |
| Bubbling | Important: Compulsory handover or vibration | Vastly reduced: easy implementation |
| Others | Compulsory handover or vibration | No handover (improved working conditions and result) |

Because of the characteristics mentioned above, the invention, may be used to the realisation of moulded objects having the aspect and the properties of the stone, in particular of structures and of statutes, of slabs, paving blocks, city or interior furniture, chimneys and analogous objects.

Similarly, the composition according to the invention may be used to the realisation of a repairing mortar by finish-polishing or a finishing decoration coat.

The invention claimed is:

1. A composition comprising water- and air-hardenable binders, exhibiting after hardening properties comparable at least to those of a natural stone, the composition consisting essentially of:
   a mixture of natural and air-borne hydraulic lime and plaster of Paris as the binders, a proportion of weight of lime and plaster ranging between 25% and 75% of both the binders;
   calcereous and/or siliceous mineral loads, a quantity of the mineral loads ranging between 0.5 and 6 times of both the binders; and
   a water-reducing adjuvant, a proportion in weight of the adjuvant ranging between 0 and 5% of the binders.

2. The composition according to claim 1, wherein the adjuvant is at least one selected from the group consisting of a set retardant, an anti-bubbling agent, an air entrainer and mixtures thereof.

3. The composition according to claim 1, wherein the composition has an apparent density of 1850 Kg/m$^3$.

4. The composition according to claim 1, wherein the composition has a setting time of 1 h.

5. The composition according to claim 1, wherein the composition has a porosity of 25%.

6. The composition according to claim 1, wherein the composition has a capillarity coefficient of 65 g/(m$^2$.sec$^{0.5}$).

7. The composition according to claim 1, wherein the composition has a sound speed of 2610 m/s.

8. The composition according to claim 1, wherein the composition has a compression mechanical strength of 40 MPa after 40 days.

9. The composition according to claim 1, wherein the composition has a flexion mechanical resistance of 8 MPa.

10. The composition according to claim 1, wherein the composition has a frost/defrost cycle resistance of 40 cycles.

11. The composition according to claim 1, wherein the composition has a surface hardness of 0.6 mm at 28 days.

12. The composition according to claim 1, wherein the composition has a retraction of 50 μm/m.

13. The composition according to claim 1, wherein the composition has a swelling of 200 μm/m.

14. The composition according to claim 1, wherein the composition has a hardening time of 2-3 hours before drawing.

15. The composition according to claim 1, wherein the composition has a drawing resistance of 7 MPa.

16. The composition according to claim 1, wherein the composition has a long term resistance of 25-30 MPa.

17. A composition having an aspect of natural stone, comprising:
   315 Kg/m$^3$ hydraulic lime;
   315 Kg/m$^3$ plaster of Paris;
   750 Kg/m$^3$ fine calcareous load;
   450 Kg/m$^3$ siliceous load;
   80 Kg/m$^3$ siliceous fines;
   18 Kg/m$^3$ fluidiser adjuvant;
   1-5 Kg/m$^3$ other adjuvants; and
   300 Kg/m$^3$ water.

18. A composition having an aspect of natural stone, comprising:
   500 Kg/m$^3$ hydraulic lime;
   500 Kg/m$^3$ plaster of Paris;
   750 Kg/m$^3$ fine calcareous load;
   20 Kg/m$^3$ fluidiser adjuvant;
   1-5 Kg/m$^3$ other adjuvants; and
   350 Kg/m$^3$ water.

* * * * *